July 14, 1936.   F. H. BENDER   2,047,251
CAR TRUCK
Filed Sept. 16, 1927   3 Sheets-Sheet 2
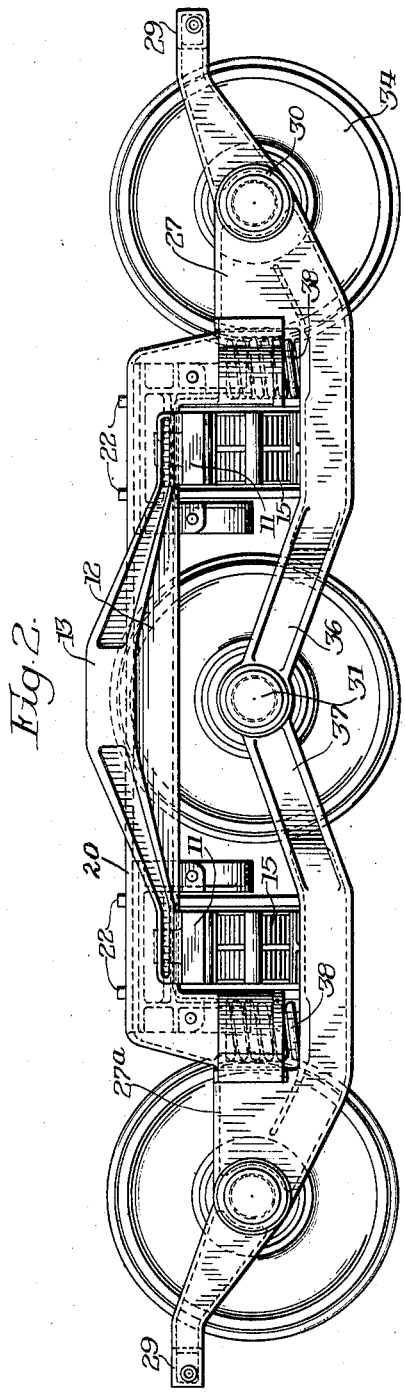
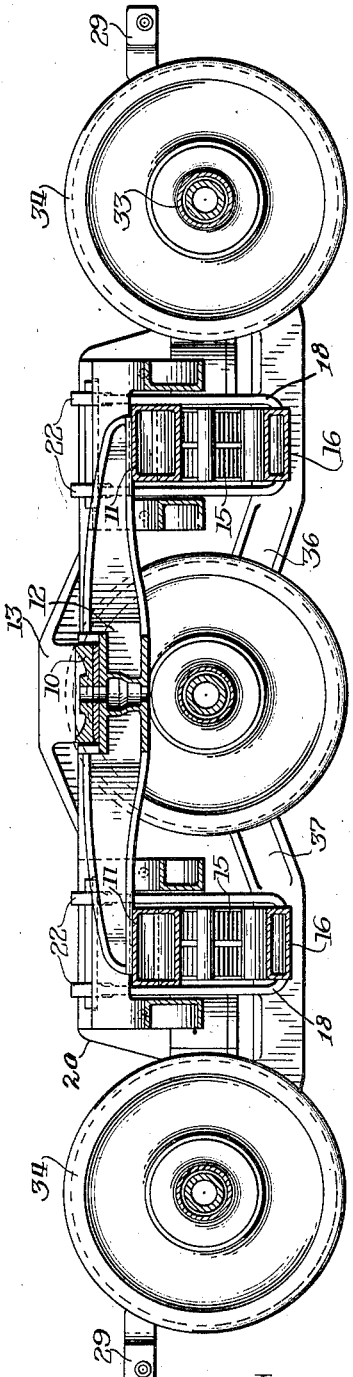
Inventor:
Frederic H. Bender

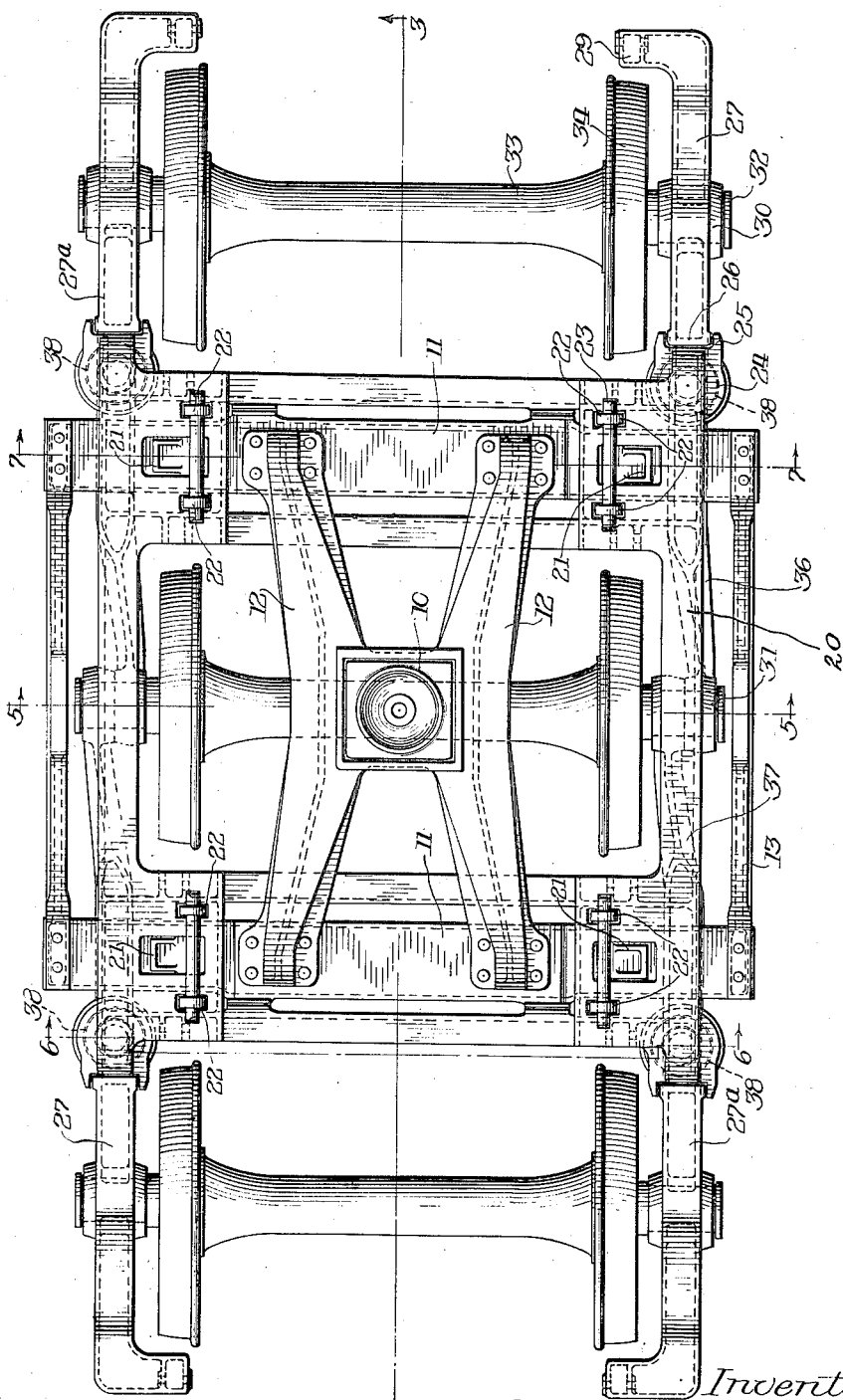

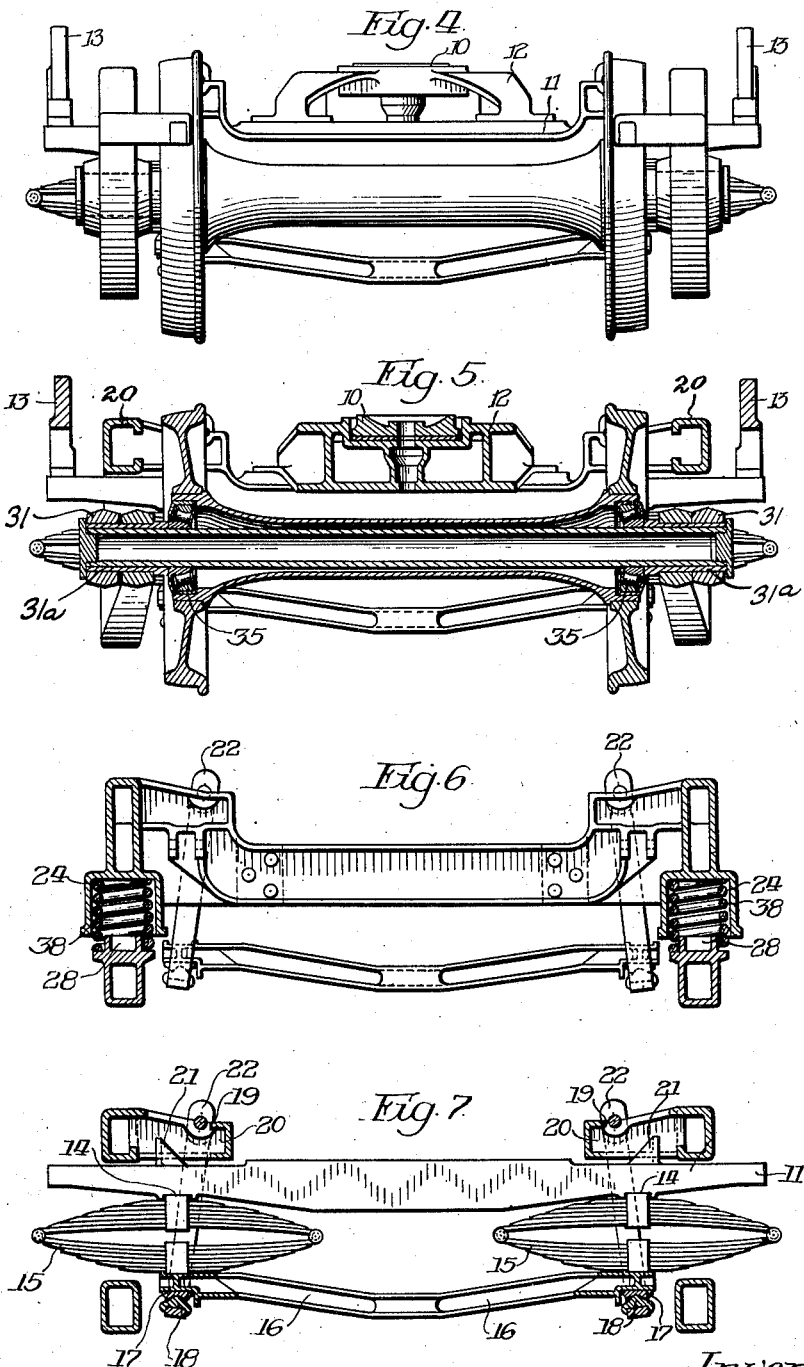

Patented July 14, 1936

2,047,251

UNITED STATES PATENT OFFICE 2,047,251

CAR TRUCK

Frederic H. Bender, Chicago, Ill., assignor to American Steel Foundries, Chicago, Ill., a corporation of New Jersey Application September 16, 1927, Serial No. 219,839

22 Claims. (Cl. 105—195)

This invention pertains to passenger car trucks and more particularly to six wheeled equalized passenger car trucks embodying wheel and axle assemblies of the fixed and rotary axle type.

As is now well known and has been for some time recognized, trucks embodying roller bearing assemblies are very much superior to the conventional type of truck both from a standpoint of economy and service. It has been found further desirable to employ a truck assembly for railroad cars wherein the weight of loads imposed on the center bearing or truck bolsters are transmitted to and are evenly distributed between the journals of the axles associated with the truck. This has been accomplished by various arrangements of the parts of the trucks and by providing equalizers between the axles, but in trucks embodying a plurality of axles more especially in the six wheel type of trucks it is very desirable and important to permit a lateral adjustment of the various wheel and axle assemblies in order to allow them to align themselves to track curvature as well as to vertical inequalities in the track or railroad bed.

It is therefore an object of this invention to provide flexible supporting means between load carrying parts of railway car trucks.

Another object is to provide a roller bearing truck having guiding and cushioning means between load carrying and operating gear carrying parts.

Still another object is to provide a truck frame having equalizers provided between axles for allowing lateral and vertical adjustment of certain of the parts of the truck assembly.

A further object is to provide a truck frame assembly provided with guiding and retaining means for retaining the equalizers and main frame in predetermined position.

Still further object is to provide a roller bearing truck assembly including wheel and axle assemblies of the fixed and rotary axle type, having equalizers cooperating with the fixed axles and the truck frame in such a manner as to permit ready adjustment of the truck assembly.

Yet another object is to provide a truck which is interchangeable with the conventional type of truck now in use on railway cars, the same employing the usual type of equipment now in use.

A different object is to provide a truck adapted for the use of the conventional truck equipment now in use with the exception of certain parts and one which will fulfill all requirements of manufacture and service.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts, Figure 1 is a top plan view of a six-wheel truck embodying the invention, Figure 2 is a side elevation of the truck shown in Figure 1, Figure 3 is a sectional elevation of the truck shown in Figure 1, the same being taken substantially in the plane as indicated by the line 3—3 of Figure 1.

Figure 4 is an end elevation of the truck shown in Figure 1,

Figure 5 is a cross-sectional elevation through the central truck and wheel and axle assembly, the same being taken substantially in the plane as indicated by the line 5—5 of Figure 1, Figure 6 is a cross-sectional elevation of the truck spring supports, the same being taken substantially in the line as indicated by the line 6—6 of Figure 1, Figure 7 is a cross-sectional elevation of the truck bolsters, the same being taken substantially in the line as indicated by the line 7—7 of Figure 1.

The truck illustrated is designed and intended for use in passenger train equipment wherever the conventional type of six-wheel truck is employed, and is interchangeable as a whole therewith in every particular, being suitable to the use of the usual type of clasp brake and all other external features of standard car equipment. It may use the usual design of coil and elliptic springs and may be adapted to the use of the standard center plate, side bearings, bolsters and side motion devices, and in fact everything with the exception of the main truck frame itself, though it will be understood and readily appreciated from the description appended hereto that the parts of such truck may be readily designed and adapted to any particular service need.

The truck consists essentially of a center plate 10 of any usual construction supported by and secured to the bolsters 11 through the arms 12. The bolsters 11 are either fixedly or pivotally secured together such as by the side bar links or bars 13 connecting the ends thereof and provided with the side bearings 13a. The bolsters on either side thereof are provided with recesses 14 adapted to position and secure the leaf or elliptic springs 15 to the bolsters, said springs being supported on and carried by the cross bars or links 16 connecting said elliptic springs transversely of the truck. The bar link 16 is provided with a seat 17 adapted to be engaged by a portion of a link 18 carried by and supported on the seat 19 on the main truck frame 20, the link 18 serving to limit the relative distance between the bar link and the main truck frame 20. The truck frame 20 includes the spaced side frame members 20a connected by the transverse transoms 20b between which the bolsters 11 are disposed, said side frame members being disposed so that they are substantially in the plane of the equalizers 27 and 27a. The frame 20 is apertured or slotted in way of a portion of the bolster 11 which is provided with an upstanding lug or stop 21 adapted to have engagement with the main truck frame to thereby limit the lateral movement of the various parts of the truck. The link 18 is of substantially U-shape being provided with suitable apertures in the ends 22 adapted to receive a securing bar 23 disposed between the ends of the link and resting on seats in the main truck frame.

The frame may be provided at suitable points thereon with the spring housings 24. Said housings and frame are provided with column guides 25 adapted to have engagement with and permitting relative movement between the column guides and columns 26 provided on the equalizers 27 and 27a. The equalizers are provided with spring seats 28 disposed in way of the housings 24, both members being adapted to receive the springs 38 which form resilient supports between the frame and the equalizing members. The equalizers are each provided with brake hanger brackets 29 for the usual brake gear. The equalizers are in turn pivotally supported by bearings or hubs 30 and 31 on stationary axles 32, the stationary axles passing through rotating axles or hubs 33 supported on and secured to the wheels 34. Such assemblies may be of the type as particularly illustrated and described in the co-pending applications to Alfred H. Oelkers, Serial No. 182,734 filed April 11, 1927; to Alfred H. Oelkers and George G. Floyd, Serial No. 184,469, filed April 18, 1927; and to Alfred H. Oelkers, Serial No. 211,385, filed August 8, 1927, said assemblies embodying in addition to the parts described, the bearings 35 disposed between the fixed and rotary axles which bearings it will be understood may be of any desired type, such as the Timken; the S K F; or self-aligning types, etc. The ends of the stationary axles are thus located outside the wheels and are engaged in the bearings or hubs 30 and 31 cast integral with the equalizers and having a slightly loose fit with respect to the stationary axles to provide for and allow angular motion, the hubs 31 being mounted on the sleeves 31a disposed on the intermediate axle adjacent its ends. It will be noticed that adjacent the center axle assembly equalizers 27 and 27a are angled outwardly and inwardly of the truck as at 36 and 37 to allow lateral alignment of the bearings of said equalizers on the central stationary axle as well as to provide clearance between the hubs and the various adjacent parts of the axle.

From the foregoing it will be seen that a very compact and flexible arrangement has been effected. The various parts may of course be formed in any manner and of any material, such as by casting, forging, etc. The weight of the car, it will be seen, is carried through the center bearing 10 to the bolsters 11 through the arms 12, tending to depress the bolsters to thereby depress the springs 15. Only a limited depression will occur however, and links 18 will serve to transfer the weight to the main truck frame 20 which is resiliently carried on the equalizers 27 and 27a. Therefore the weight is transferred to these equalizers and in turn to the wheel and axle assemblies. Due to the disposition of the parts of the truck, that is, that the main frame is provided with column guides having cooperative engagement with columns provided on the equalizers, said columns being disposed adjacent the outer axles and the equalizer and the side frames of the main frame being free of the central axle, the central axle is permitted to move laterally with respect to the outer axles, that is, there will be a pivotal movement of the column guides about the columns, this action being permitted even though the side frame is resiliently supported on the equalizers as the coil springs are disposed adjacent the columns. Due to the vertical action of the supporting springs 38 disposed between the housings 24 and the supporting member 28, and in addition to the transverse angling of the equalizer permitted by the slightly loose fit between the hubs and the fixed axles, lateral displacement of the middle pair of wheels is permitted, allowing the three pairs of wheels to align themselves to track curvature as well as to the vertical inequalities in the track or road bed, and all this action is accomplished with the minimum of strain and wear to the parts because of the disposition thereof, their suspension, relative movement between the parts, and due to the fact that there is no continued rotation between the supporting axles and the equalizers, these axles being fixed, the only motion occurring between these parts being the slight angular and circumferential movement.

It is to be understood that I do not wish to be limited by the exact embodiment of the device shown, as other and various embodiments will of course occur to those skilled in the art.

I claim:

1. In a truck, the combination of spaced wheel and axle assemblies, a sleeve mounted on an axle of said assemblies, and an equalizer having a journal rigid therewith and concentrically mounted on said sleeve, said equalizer being mounted to permit relative angular movement between said equalizer and sleeve.

2. In a truck, the combination of spaced wheel and axle assemblies, said wheel and axle assemblies including an outer wheeled rotary axle, an inner normally stationary axle, anti-friction bearings between said axles, a sleeve mounted on said stationary axle and abutting said bearings, and an equalizer having a journal concentrically mounted on said sleeve, said equalizer being mounted to permit relative angular movement between said equalizer and sleeve.

3. In a six-wheel truck, the combination of spaced wheel and axle assemblies, a sleeve mounted on each of the axles of said assemblies, equalizers having journals concentrically mounted on the sleeves of the end of said spaced axles, each of said equalizers having journals mounted concentrically on the sleeve of the center of said axles and in side by side relation transversely of said truck, said equalizers being mounted to permit relative angular movement between the same and said sleeves.

4. In a six-wheel truck, the combination of spaced wheel and axle assemblies, each of said wheel and axle assemblies including an outer wheeled rotary axle, an inner normally stationary axle, anti-friction bearings between said axles, a sleeve mounted on said stationary axle and abutting said bearings, equalizers having journals concentrically mounted on the sleeves of the end of said spaced axles, each of said equalizers having journals mounted concentrically on the sleeve of the center of said axles and in side by side relation transversely of said truck, said equalizers being mounted to permit relative angular movement between the same and said sleeves.

5. In a six-wheel truck, the combination of outer and intermediate wheel and axle assemblies, equalizers disposed on each side of said truck and journaled on the adjacent ends of the axles of said wheel and axle assemblies, a main frame resiliently supported on said equalizers and including side frames and transversely connecting transoms, a single column on each of said equalizers adjacent the outer of said wheel and axle assemblies and cooperative column guides on said main frame constituting the sole slidable connections between said main frame and equalizers.

6. In a six-wheel truck, the combination of outer and intermediate wheel and axle assemblies, equalizers disposed on each side of said truck and journalled on the adjacent ends of the axles of said wheel and axle assemblies, a main frame resiliently supported on said equalizers and including side frames and transversely connecting transoms, a single column on each of said equalizers adjacent the outer of said wheel and axle assemblies and cooperative column guides on said main frame constituting the sole connections between said main frame and equalizers.

7. In a six-wheel truck, the combination of spaced wheel and axle assemblies, equalizers pivotally connecting the ends of adjacent axles, said equalizers being connected to said axles to permit relative horizontal angular movement therebetween, said equalizers having columns adjacent the end axles, a main truck frame including side frames and connecting transoms, said side frames being disposed substantially in the plane of said equalizers, said truck frame having column guides cooperating with said columns, said columns and column guides being arranged to permit pivoting between the frame and equalizers due to said relative angular movement between said equalizers and axles whereby the central of the axles may move laterally with respect to the end axles.

8. In a six-wheel truck, the combination of spaced wheel and axle assemblies, equalizers pivotally connecting the ends of adjacent axles, said equalizers being connected to said axles to permit relative horizontal and vertical angular movement therebetween, said equalizers having columns adjacent the end axles, a main truck frame including side frames and connecting transoms, said side frames being disposed substantially in the plane of said equalizers, said truck frame having column guides slidably cooperating with said columns for vertical movement with respect thereto, said columns and column guides being arranged to permit pivoting between the frame and equalizers due to said relative angular movement between said equalizers and axles whereby the central of the axles may move laterally with respect to the end axles.

9. In a six-wheel truck, the combination of spaced wheel and axle assemblies, equalizers pivotally connecting the ends of adjacent axles, said equalizers being connected to said axles to permit relative horizontal and vertical angular movement therebetween, said equalizers having columns adjacent the end axles, a main truck frame including side frames and connecting transoms, said side frames being disposed substantially in the plane of said equalizers, said truck frame having column guides slidably cooperating with said columns for vertical movement with respect thereto, means resiliently supporting said main frame on said equalizers, said columns and column guides being arranged to permit pivoting between the frame and equalizers due to said relative angular movement between said equalizers and axles whereby the central of the axles may move laterally with respect to the end axles.

10. In a six-wheel truck, the combination of outer and intermediate wheel and axle assemblies, equalizers disposed on each side of said truck and journalled on the adjacent ends of the axles of said wheel and axle assemblies, a main frame resiliently supported on said equalizers and including side frames and transversely connecting transoms, said side frames being disposed substantially in the plane of said equalizers, a single column on each of said equalizers adjacent the outer of said wheel and axle assemblies and cooperative column guides on said main frame constituting the sole slidable connections between said main frame and equalizers.

11. In a six-wheel truck, the combination of outer and intermediate wheel and axle assemblies, equalizers disposed on each side of said truck and journalled on the adjacent ends of the axles of said wheel and axle assemblies, a main frame resiliently supported on said equalizers and including side frames and transversely connecting transoms, said side frames being disposed substantially in the plane of said equalizers, a single column on each of said equalizers adjacent the outer of said wheel and axle assemblies and cooperative column guides on said main frame constituting the sole connections between said main frame and equalizers.

12. In a six-wheel truck, the combination of outer and intermediate wheel and axle assemblies, equalizers disposed on each side of said truck and journalled on the adjacent ends of the axles of said wheel and axle assemblies, said equalizers being connected to said axles to permit relative horizontal angular movement therebetween, columns on said equalizers adjacent the outer of said wheel and axle assemblies, a main frame resiliently supported on said equalizers and including side frames and transversely connecting transoms, said side frames being disposed substantially in the plane of the associated equalizers, said main frame having column guides cooperating with said columns, said columns and column guides being arranged to permit pivoting between the frame and equalizers due to said relative angular movement between said equalizers and axles whereby the central of the axles may move laterally with respect to the end axles.

13. In a six-wheel truck, the combination of spaced wheel and axle assemblies, equalizers disposed on each side of said truck and journalled on the adjacent ends of the axles of said wheel and axle assemblies, said equalizers being connected to said axles to permit relative horizontal angular movement therebetween, a main frame resiliently supported on said equalizers and including side frames and transversely connecting transoms, said side frames being disposed substantially in the plane of the associated equalizers, said main frame having column guides cooperating with said columns, said columns and column guides being arranged to permit pivoting between the frame and equalizers due to said relative angular movement between said equalizers and axles whereby the central of the axles may move laterally with respect to the end axles, said columns and guides constituting the sole slidable connections between said main frame and equalizers.

14. In a six-wheel truck, the combination of spaced wheel and axle assemblies, equalizers disposed on each side of said truck and journalled on the adjacent ends of the axles of said wheel and axle assemblies, said equalizers being connected to said axles to permit relative horizontal angular movement therebetween, a main frame resiliently supported on said equalizers and including side frames and transversely connecting transoms, said side frames being disposed substantially in the plane of the associated equalizers, said main frame having column guides cooperating with said columns, said columns and column guides being arranged to permit pivoting between the frame and equalizers due to said relative angular movement between said equalizers and axles whereby the central of the axles may move laterally with respect to the end axles, said columns and guides constituting the sole connections between said main frame and equalizers.

15. In a six-wheel truck, the combination of spaced wheel and axle assemblies, equalizers pivotally connecting the ends of adjacent axles, said equalizers being connected to said axles to permit relative horizontal angular movement therebetween, said equalizers having columns adjacent the end axles, a main truck frame having column guides cooperating with said columns, said columns and column guides being arranged to permit pivoting between the frame and equalizers due to said relative angular movement between said equalizers and axles whereby the central of the axles may move laterally with respect to the end axles, and connected bolsters supported for lateral movement on said main frame.

16. In a six-wheel truck, the combination of spaced wheel and axle assemblies, equalizers pivotally connecting the ends of adjacent axles, said equalizers being connected to said axles to permit relative horizontal angular movement therebetween, said equalizers having columns adjacent the end axles, a main truck frame having column guides cooperating with said columns, said columns and column guides being arranged to permit pivoting between the frame and equalizers due to said relative angular movement between said equalizers and axles whereby the central of the axles may move laterally with respect to the end axles, and connected bolsters resiliently supported for lateral movement on said main frame.

17. In a six-wheel truck, the combination of spaced wheel and axle assemblies, equalizers pivotally connecting the ends of adjacent axles, said equalizers being connected to said axles to permit relative horizontal angular movement therebetween, said equalizers having columns adjacent the end axles, a main truck frame having column guides cooperating with said columns, said columns and column guides being arranged to permit pivoting between the frame and equalizers due to said relative angular movement between said equalizers and axles whereby the central of the axles may move laterally with respect to the end axles, and connected bolsters supported for lateral movement on said main frame, the connection between said bolsters providing side bearings outwardly of said equalizers, said bolsters supporting a center bearing inwardly of said equalizers.

18. In a six-wheel truck, the combination of spaced wheel and axle assemblies, equalizers pivotally connecting the ends of adjacent axles, said equalizers being connected to said axles to permit relative horizontal angular movement therebetween, said equalizers having columns adjacent the end axles, a main truck frame having column guides cooperating with said columns, said columns and column guides being arranged to permit pivoting between the frame and equalizers due to said relative angular movement between said equalizers and axles whereby the central of the axles may move laterally with respect to the end axles, and connected bolsters resiliently supported for lateral movement on said main frame, the connections between said bolsters providing side bearings outwardly of said equalizers, said bolster supporting a center bearing inwardly of said equalizers.

19. In a six-wheel truck, the combination of spaced wheel and axle assemblies, equalizers pivotally connecting the ends of adjacent axles, said equalizers being connected to said axles to permit relative vertical and horizontal angular movement therebetween, said equalizers having columns adjacent the end axles, a main truck frame having column guides slidably cooperating with said columns for vertical movement with respect thereto, coil springs resiliently supporting said main frame on said equalizers adjacent said columns, said columns and column guides being arranged to permit pivoting between the frame and equalizers due to said relative angular movement between said equalizers and axles whereby the central of said axles may move laterally with respect to the end axles and a bolster resiliently supported on said truck frame through leaf springs.

20. In a six-wheel truck, the combination of spaced wheel and axle assemblies, equalizers pivotally connecting the ends of adjacent axles, said equalizers being connected to said axles to permit relative horizontal angular movement therebetween, said equalizers having columns adjacent the end axles, a main truck frame including side frames and connecting transoms, said side frames being disposed substantially in the plane of said equalizers, said truck frame having column guides cooperating with said columns, said columns and column guides being arranged to permit pivoting between the frame and equalizers due to said relative angular movement between said equalizers and axles whereby the central of the axles may move laterally with respect to the end axles, bolsters disposed adjacent said transoms and resiliently mounted thereon, said truck frame being resiliently mounted on said equalizers, the resilient mounting between said bolster and transom being of a different character than the equalizer mounting between said truck frame and equalizers.

21. In a six-wheel truck, the combination of spaced wheel and axle assemblies, equalizers pivotally connecting the ends of adjacent axles, said equalizers being connected to said axles to permit relative vertical and horizontal angular movement therebetween, said equalizers having columns adjacent the end axles, a main truck frame including side frames and connecting transoms, said side frames being disposed substantially in the plane of said equalizers, said truck frame having column guides slidably cooperating with said columns for vertical movement with respect thereto, means resiliently supporting said main frame on said equalizers, through coil springs, said columns and column guides being arranged to permit pivoting between the frame and equalizers due to said relative angular movement between said equalizers and axles whereby the central of the axles may move laterally with respect to the end axles, and bolsters resiliently mounted for lateral movement on said transoms through leaf springs.

22. In a six-wheel truck, the combination of spaced wheel and axle assemblies, equalizers disposed on each side of said truck and journalled on the adjacent ends of the axles of said wheel and axle assemblies, said equalizers being connected to said axles to permit relative horizontal angular movement therebetween, a main frame resiliently supported on said equalizers through coil springs, said main frame including side frames and transversely connecting transoms, said side frames being disposed substantially in the plane of the associated equalizers, said main frame having column guides cooperating with said columns, said columns and column guides being arranged to permit pivoting between the frame and equalizers due to said relative angular movement between said equalizers and axles whereby the central of the axles may move laterally with respect to the end axles, said columns and guides constituting the sole slidable connections between said main frame and equalizers, and bolsters resiliently mounted for lateral movement on said transoms through leaf springs.

FREDERIC H. BENDER.